INVENTOR.
LEAMAN REX BEYER
BY Alfred R. Fuchs
ATTORNEY

United States Patent Office 3,452,831
Patented July 1, 1969

3,452,831
ROTARY REAMING AND DRILLING BIT
Leaman Rex Beyer, Diamond, Mo. 64840
Filed Sept. 20, 1967, Ser. No. 669,151
Int. Cl. E21b 9/08; E21c 13/00
U.S. Cl. 175—374                    15 Claims

ABSTRACT OF THE DISCLOSURE

A rotary drilling bit having a body portion on which a plurality, usually three, cutter members are mounted for rotation on antifriction bearings with the axes of rotation of the cutter members extending at an oblique angle to the axis of the body portion and converging downwardly, each cutter having a body portion that decreases in diameter in opposite directions from a maximum diameter heel portion to provide a tapering drilling portion and a tapering reaming portion. The reaming portion has one or more circumferential grooves in it in which a circumferentially extending row of spaced inserts of hard wear resistant material is mounted on one wall thereof, and the portion of maximum diameter with a circumferentially extending row of hard wear resistant material inserts in it. All the inserts have longitudinal axes that extend at the same oblique angle to the axis of the drill body portion. The lower tapering drilling portion of each cutter member has similar inserts of the hard wear resistant material mounted in it which have longitudinal axes extending parallel to the axis of rotation of the drill body portion when in engagement with the bottom of the hole. The inserts are preferably made of tungsten carbide and the groove or grooves serve to receive the drill cuttings and air or water to clean out these cuttings at the bottom of the hole, from an air or water passage in the drill body portion. The reaming carbides extend from the cutter members so that they will ream the bore to full size as the drill passes downwardly.

---

One of the purposes of my invention is to provide a rotary bit that is provided with a plurality of rolling cutters, that are so constructed that they will keep the full gauge of the well bore as the drill descends in the same and which will lengthen the life of the roller cutters and of the bearings therefor by equalizing the stress on the roller cutters and their bearings.

This is accomplished by providing one or more circumferentially extending rows of reaming carbide inserts extending at an oblique angle to the axis of rotation of the drill body portion, in a tapering portion of each of the cutters, that extends upwardly from the heel portion or portion of maximum diameter of said cutters and providing grooves in which these carbides are located, which grooves serve as air or water courses to receive the drill cuttings and any worn particles of the carbides, so that the same can be carried out of the drill hole along with the other cuttings at the bottom of the hole. The removal of the cuttings reduces the friction that is encountered in the drilling operations and the location of the inserts is such as to overcome the unbalanced load on the bearings of the roller cutters existing under conditions where all of the drilling action takes place at and downwardly from the heel portion or portion of maximum transverse diameter of the roller cutter members. By providing a more uniform pressure on the antifriction bearing members of the roller cutters the life of the bit is greatly extended. The gauge of the well bore is reamed continuously by the reaming inserts and these are so positioned they will ream the hole or bore to the full gauge of the bit.

It is a further purpose of my invention to provide such positioning of the elongated inserts of tungsten carbide, or similar hard wear resisting material, that their longitudinal axes extend at an oblique angle to the axis of rotation of the bit and thus at a downwardly inclined position with respect to the well bore so that the downward force exerted on the bit will be acting at an oblique angle on the wall of the well bore so as to obtain an efficient reaming action from the inserts. While there have been what are known as drag carbides provided in rotary drilling bits, these engage with the wall of the bore so as to be ineffective in maintaining the gauge of the bore by a reaming action, because of the direction of extent of the axes of these inserts, which is at right angles to the axis of rotation of the body portion of the bit, instead of at an oblique angle to the axis when in engagement with the well bore wall.

Providing for the free passage of the drill cuttings from the wall of the hole prevents the drill cuttings from causing a clogging action and reduces the friction between the wall of the well bore and the bit, which results in a much freer rotation of the bit in the well bore. The angular position of the hard, wear resisting inserts in the reaming portion of the cutter is the same as that of the inserts at the heel portion or portion of maximum diameter thereof, and the inserts are so positioned that the inserts that are located at such portion of maximum diameter and the one or more circumferentially extending rows of inserts in the grooves in the reaming portion thereof are in vertical alignment with each other at their wall engaging positions so that all cooperate to accomplish the reaming action and prevent the bit from binding in the well bore and the gradual reduction in the diameter of the well bore as drilling proceeds.

Other objects and advantages of my invention will appear as the description of the drawings proceeds. I desire to have it understood, however, that I do not intend to limit myself to the particular details shown or described except as defined in the claims.

Figure 1:
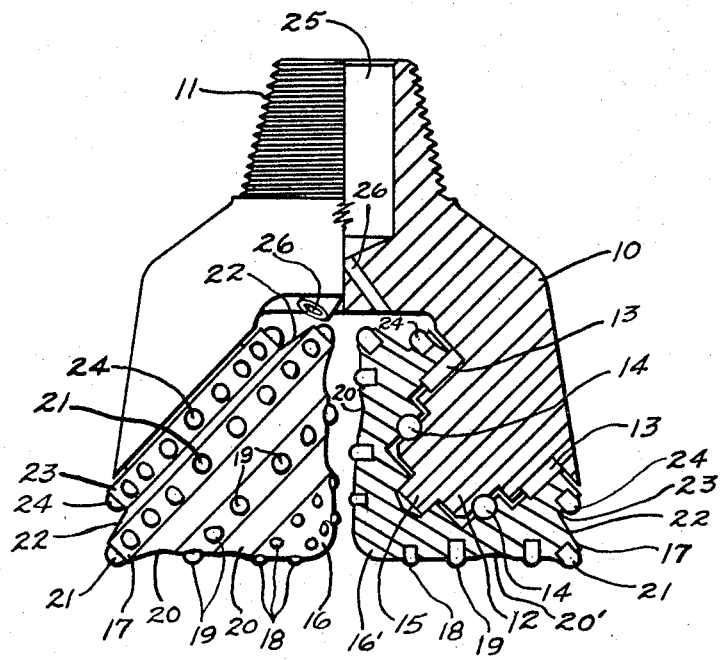
FIG. 1 is a view partly in elevation and partly in longitudinal section of a rotary drilling bit having cutter members to which my invention has been applied.

Referring in detail to the drawings, in FIG. 1 is shown a rotary drill bit which is provided with a body portion 10 having its upper threaded end portion 11 adapted to be connected with drill pipe extending down into the wellbore. The entire rotary bit rotates with the drill pipe about the axis of the threaded portion 11. The body portion 10 is provided with a plurality of hubs 12, ordinarily three such hubs being provided, upon which are mounted anti-friction bearings such as the roller bearings 13 and ball bearings 14. While a combination of roller and ball bearings is shown, the type of anti-friction bearings which are used may be varied as found to be desirable. The hub portion has a reduced extension 15. Mounted on the hub portions 12 are the rotary cutter members. In FIG.

1 two of said cutter members 16 and 16' are shown. Each of said cutter members has a bore having means for receiving the anti-friction bearing members 13 and 14 and a reduced bore portion in which the reduced extension 15 is mounted. The cutter members, of which two are shown, 16 and 16', are constructed so that they can be mounted in close proximity to each other so as to properly drill the well-bore, and in order to do this, each of said cutters has to be made slightly different from the adjacent cutter so that these in a manner interfit.

Said cutter members are provided with a body portion that tapers in opposite directions from the portion of maximum transverse diameter 17 providing a drilling portion that extends downwardly toward the bottom end of each of said cutter members from the portion of maximum transverse diameter and a reaming portion that extends upwardly from said portion of maximum transverse diameter. The drilling portions of the bits 16 and 16' are shown as being provided with inserts of wear-resistant material such as tungsten-carbide. In the particular bits shown there are two sizes to these inserts of wear-resistant material shown the inserts of wear-resistant material 18 in the lower tapering end portions of said cutters being smaller than the inserts 19 that are located nearer the portion of maximum transverse diameter. Both the inserts 18 and 19 are of the same general character being of an elongated character and firmly seated in suitable openings in the body portion of the cutter member and having rounded outer end portions. The longitudinal axis of each of said inserts 18 and 19 it will be noted extends in such a direction that their longitudinal axes will be parallel to the axis of rotation of the body portion 10, when the inserts are in engagement with the bottom of the well-bore, where the drilling operation is taking place. It will be noted that the inserts 19 on the cutter member 16' are in such a position that these are opposite grooves 20 in the cutter member 16. Similarly the inserts 19 in the cutter member 16 are opposite a groove 20' in the cutter member 16'.

The portions 17 of maximum transverse diameter of said cutter members are provided with inserts 21 of wear-resistant material which extend in a row around the portion of maximum transverse diameter 17 circumferentially of said cutter member. The inserts 21 are of a similar character as the inserts 19, having rounded ends and being circular in cross section, but are positioned so that their longitudinal axes will be at an oblique angle to the axis of rotation of the drill bit when in contact with the well-bore wall and bottom. The angle of the longitudinal axis of these inserts 21 is approximately 35° to the axis of rotation of the drill bit. The upper upwardly tapering end portion of each of the drill bits 16 and 16' is provided with a sharply inwardly inclined annular wall portion 22 and an annular wall portion 23 extending at an oblique angle thereto which is preferably slightly greater than a right angle. Thus providing an annular groove that is approximately V-shaped in cross section extending around the upper tapering end portion of the cutter member. Mounted in the groove thus provided in the cutter member is an annular series of wear-resistant inserts 24 of the same general character as the wear-resistant inserts 19, being circular in cross section and having rounded ends. These are positioned with their longitudinal axes substantially parallel to the longitudinal axes of the inserts 21 and thus at a downwardly inclined oblique angle to the axis of the rotation of the drill bit when said inserts 24 are in engagement with the sidewall of the well-bore.

The bit is provided with a passage 25 therein which connects with a passage in the drill pipe through which drilling fluid, water, air or other fluid material can be passed as may be found desirable. Extending from the fluid passage 25 are a plurality of fluid passages 26, the same opening into the space in which the cutter members are mounted. It will be seen from FIG. 1 that the fluid passages 26 discharge in a direction such that the fluid, such as air or water, discharged therefrom will be discharged into the annular groove provided between the annular walls 22 and 23 on said cutter members. Thus the inserts 24 are mounted on the one wall of an approximately V-shaped in cross section annular groove into which the fluid from the passages 26 is discharged, forming fluid passages that receive the drill cuttings and carry them downwardly into the bottom of the well-bore.

Figure 2:
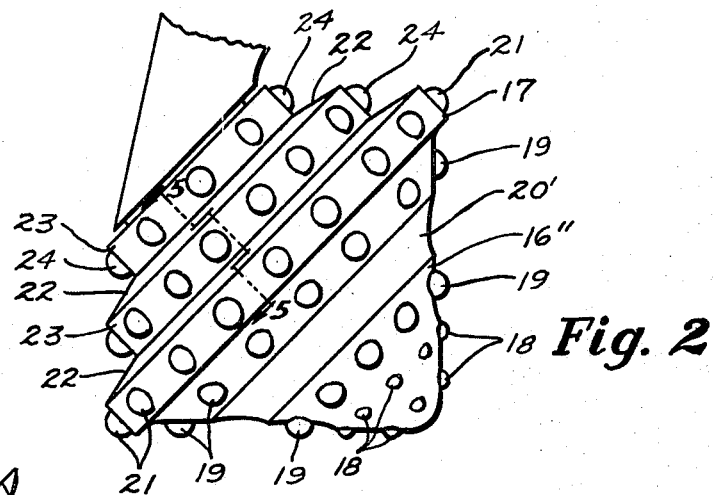
FIG. 2 is a fragmentary view of one of said drilling bits showing a slightly modified cutter member in elevation.

While a single groove and a single annular circumferential row of wear-resistant inserts 24 is shown in FIG. 1, a plurality of such grooves and rows of inserts may be provided, if found desirable. In FIG. 2 a cutter member is shown that is similar to those shown in FIG. 1, but is modified so as to provide more than one groove for the reaming inserts. The lower drilling end portion, of the cutter member 16" shown in FIG. 2 is similar to that of the cutter member 16' shown in FIG. 1 except that it has one additional row of the smaller inserts 18 in said lower end portion, in a similar manner to that of the cutter member 16. However, it has the groove 20' located between the two rows of inserts 19 as in the cutter member 16'. The cutter member 16" is provided with a portion of maximum transverse diameter 17, which is provided with the wear-resistant material inserts 21 that extend in the same direction as previously described in connection with said insert 21 in FIG. 1, and has an upwardly tapering upward end portion which is of a stepped character having the inclined obliquely extending walls 22 and the walls 23 extending at substantially right angles thereto, thus forming a pair of grooves that are similar to the grooves described in connection with FIG. 1, for receiving the fluid from the discharge passages in the drill bit.

Figure 5:
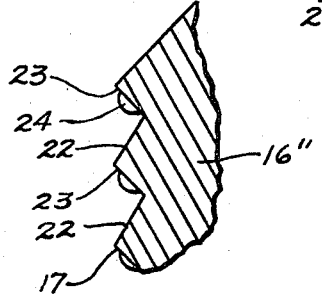
FIG. 5 is a fragmentary detail sectional view taken on the broken line 5—5 of FIG. 2.

The walls 23 of the grooves in said bit 16" are provided with the inserts 24 of wear-resistant material that are the same as the inserts previously described in connection with FIG. 1, these being arranged each in an annular or circumferential series in spaced relation extending around each of the grooves, and being mounted in said wall portions 23 to project therefrom as shown in FIG. 2. The fragmentary section, FIG. 5, shows the arrangement of the wall portions 22 and 23 in more detail, the section being taken so as to avoid most of the inserts 24, so as to more clearly show the arrangement of said annular wall portions. It will be noted that the wall portions 23 extend substantially parallel to the outer face of the portion of maximum transverse diameter 17.

Figure 7:
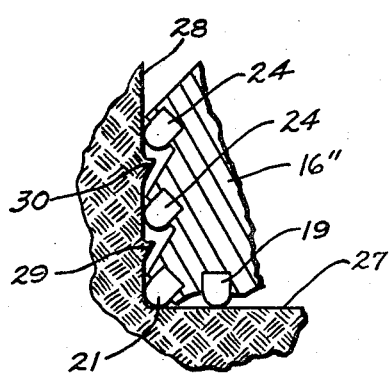
FIG. 7 is a fragmentary diagrammatic sectional view showing the position of my inserts of wear-resisting material with respect to the wall of a well-bore.

Referring now to the diagrammatic view showing the position of the wear-resistant reaming inserts with respect to the wall of the well-bore, FIG. 7, a plurality of rows of said reaming inserts being shown, such as in the cutter member 16", the bottom of the well-bore is indicated by the numeral 27 and the side wall of the well-bore by the numeral 28. Projections 29 and 30 are indicated as extending into the well-bore from the wall 28. Such projections will result from failure of the inserts 19 and 21 to remove all of the material from the side wall of the well-bore. Also it is to be noted that as the cutter members wear and are reduced in size, and the wear-resistant inserts 19 and 21 similarly wear, that the over-all diameter of the well-bore will decrease. However, by providing the inserts 24 in the grooves in the upper tapering reaming portion of the cutter, not only is the gauge of the well-bore maintained even though the cutter has worn to some extent, but any projecting material will be removed by the downward movement of the reaming inserts 24.

When a new bit is first put into operation the inserts 21 do most, if not all of the reaming action, but as wear continues the inserts 24 come into action more and more to do the required reaming to keep well-bore of the desired transverse diameter. This makes it possible to use a bit having my cutter members provided thereon for a much longer period of time than is possible without the use of my reaming cutter members. This greatly reduces the expense incident to removing a bit from a well-bore to replace the same with a new bit or with new cutter members. The angular position of the inserts, provides for more efficient reaming action thereby because the downward pressure that is being exerted by the string of drill pipe on the bit, is acting in a direction at an oblique angle to the longitudinal axis of the insert 24 instead of at right angles thereto as has been proposed in the prior art.

Figures 3, 4:
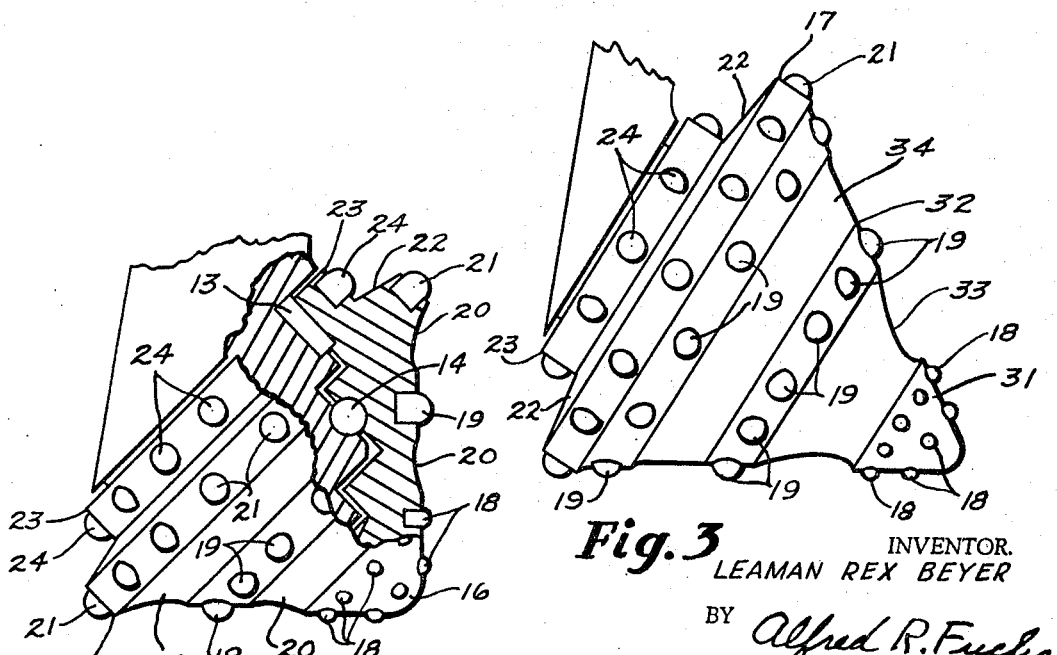
FIG. 3 is a view similar to FIG. 2 of a different type of rotary cutter member to which my invention is applied.
FIG. 4 is a fragmentary view of the rotary bit shown in FIG. 1 showing the rotary cutter member that is at the left of FIG. 1 partly in elevation and partly in section.

It will also be noted, with reference to FIGS. 1 and 4, that when the reaming inserts are in engagement with the wall of the well-bore and the inserts 21 are also in engagement with said wall and with the well bottom, that the force exerted by the inserts 18 and 19 on the bearings at an oblique angle thereto is principally all on one end of the bearing structure carried by the hub portion 12, the pressure exerted by the inserts 21 and 24, which is substantially at right angles to the axis of the hub portion 12, counterbalances the force exerted by the action of the inserts 18 and 19 in their drilling action, thus reducing the overbalanced condition of the forces exerted on the anti-friction bearings of the cutter members. Often the life of a bit is reduced due to the destruction or damage of the anti-friction bearings which causes the cutter members to stall thus making it necessary to remove the bit and replace it with new bit.

My invention is applicable to any type of rotary drilling bit cutting member. Thus in FIG. 3 my invention is shown as being applied to a cutter that has a considerably more sharply tapered lower end portion 31 than the cutters 16, 16′ and 16″, said cutter 32 being shown as being provided with the smaller inserts 18 in said lower tapering end portion 31 and having a groove 33 therein and an annular portion provided with the larger inserts 19 previously described. The particular cutter shown in FIG. 3 also has a groove 34 therein and another annular row of inserts 19 that are drilling inserts and a portion of maximum transverse diameter 17, which is provided with the inserts 21 previously described. The reaming portion of the cutter upwardly from the portion of maximum transverse diameter 17 is provided with the annular wall portions 22 and 23 to provide the groove in which the inserts 24 are mounted in the same manner as previously described, the action of the reaming inserts 24 being the same as described in connection with other forms of the invention. It will be noted that the cutter member 32 shown in FIG. 3 has a body portion that tapers in opposite directions from the portion of maximum transverse diameter 17 just as do the body portions of the cutter members 16, 16′ and 16″.

Figure 6:
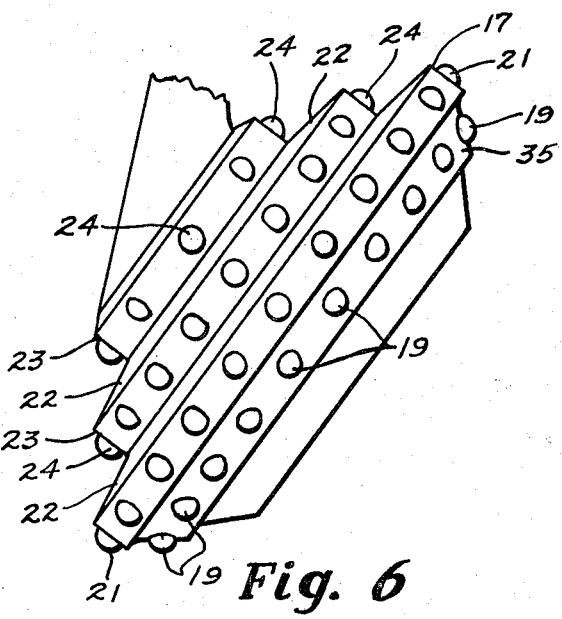
FIG. 6 is a fragmentary view of a rotary drill bit showing another type of cutter member to which my invention is applied.

My invention is also applicable to what is sometimes referred to as a side roller cutter such as shown in FIG. 6 in which the portion of maximum transverse diameter 17 is provided with the inserts 21 that extend in the same manner as previousy described and which has a tapering portion extending downwardly from said portion of maximum transverse diameter which has an annular wall portion 35 that is provided with the wear-resistant material inserts 19 and which has an upwardly tapering portion extending from the portion of maximum transverse diameter 17, which may be provided with any desired number of grooves in which the wear-resistant inserts 24 are mounted, the form shown in FIG. 6 having a pair of such grooves having the wall portions 22 and 23, as previously described, and having the wear-resistant material inserts 24 mounted in the wall portions 23 of said grooves in the same manner as previously described in connection with the other forms of the invention.

While a single groove and a single circumferential row of wear-resistant reaming inserts are shown in connection with certain forms of cutter members shown in the drawings and a plurality of grooves and rows of said reaming inserts 24 are shown in connection with other forms of cutter members illustrated, it is to be understood that the number of grooves in the upper tapering or reaming portion of any of said cutter members can be varied as may be found desirable, as long as same are provided with annular or circumferential rows of wear-resistant reaming inserts 24 positioned in grooves substantially as shown in the drawings. The reaming action of the bit will be the same in the case of any of the cutter members disclosed and the number of rows of reaming inserts of that may be required, in the reaming portion of the cutter member will be somewhat dependent on the type of material that is encountered in the drilling operation.

What I claim is:

1. A rotary drill having a body portion mounted for rotation about its axis, a plurality of cutter members each mounted on said body portion for rotation about an axis extending at an oblique angle to the axis of said body portion, the axes about which said cutter members rotate converging downwardly, each of said rotatably mounted cutter members having a body portion decreasing in diameter in opposite directions from a portion of maximum diameter to provide a lower tapering drilling portion and an upper tapering reaming portion on each of said rotary cutter members, said reaming portion having an outwardly opening continuous circumferential groove therein, said groove having annular walls extending at an angle to each other, and a circumferentially extending row of spaced inserts of hard wear resistant material mounted on one of said annular walls of said groove and projecting from said reaming portion in spaced relation to the annular wall of said groove extending at an angle to said first mentioned wall.

2. The rotary drill claimed in claim 1 in which each of said inserts has its longitudinal axis extending at an oblique angle to the axis of said drill body portion.

3. The rotary drill claimed in claim 1 in which said reaming portion is provided with a plurality of said circumferential grooves, said grooves being axially spaced, and a circumferentially extending row of said inserts is mounted in each of said grooves and projecting from said reaming portion.

4. The rotary drill claimed in claim 1 in which a circumferential row of inserts of hard wear resistant material is mounted in said portion of maximum diameter and project therefrom each insert having its longitudinal axis extending at an oblique angle to the axis of said drill body portion.

5. The rotary drill claimed in claim 1 in which a circumferential row of inserts of hard wear resistant material is mounted in said portion of maximum diameter and project therefrom each insert having its longitudinal axis extending at an oblique angle to the axis of said drill body portion all of said inserts having their axes extending at approximately the same angle to the axis of said drill body portion.

6. The rotary drill claimed in claim 1 in which said reaming portion is provided with a plurality of said grooves, said grooves being axially spaced and a circumferentially extending row of said inserts mounted in each of said grooves and projecting from said reaming portion and a circumferential row of inserts of hard wear resistant material is mounted in said portion of maximum diameter and projecting therefrom, all said inserts in said reaming portion and in said portion of maximum diameter having their axes extending at approximately the same angle to the axis of said drill body portion.

7. The rotary drill claimed in claim 1 in which said drilling portion has inserts of hard wear resistant material mounted therein and projecting therefrom.

8. The rotary drill claimed in claim 1 in which said reaming portion is provided with a plurality of said grooves, said grooves being axially spaced a circumferentilly extending row of said inserts mounted in each of said grooves and projecting from said reaming portion, and a circumferential row of inserts of hard wear resistant material is mounted in said portion of maximum diameter and project therefrom, all said inserts in said reaming portion and in said portion of maximum diameter having their axes extending at approximately the same angle to the axis of said drill body portion and said drilling portion has inserts of hard wear resistant material mounted therein and projecting therefrom.

9. The rotary drill claimed in claim 1 in which the body portion has fluid passages and said groove is so located as to receive fluid discharged from said passages.

10. The rotary drill claimed in claim 3 in which the body portion has fluid passages and said grooves are so located as to receive fluid discharged from said passages.

11. The rotary drill claimed in claim 1 in which the walls of said groove extend at an obtuse angle to each other, the body portion has fluid passages and said groove is so located as to receive fluid discharged from said passages.

12. A rotary drill having a body portion mounted for rotation about its axis, a plurality of cutter members each mounted on said body portion for rotation about an axis extending at an oblique angle to the axis of said body portion, the axes about which said cutter members rotate converging downwardly, each of said rotatably mounted cutter members having a body portion decreasing in diameter in opposite directions from a portion of maximum diameter to provide a lower tapering drilling portion and an upper tapering reaming portion of stepped formation on each of said rotary cutter members, said reaming portion having an outwardly opening continuous circumferential groove therein and a circumferential row of spaced inserts of hard wear resistant material mounted in said groove and projecting from said reaming portion, each of said inserts in said groove having its longitudinal axis extending at an oblique angle to the axis of said drill body portion.

13. The rotary drill claimed in claim 12 in which a circumferential row of inserts of hard wear resistant material is mounted in said portion of maximum diameter and project therefrom, each insert having its longitudinal axis extending at an oblique angle to the axis of said drill body portion.

14. The rotary drill claimed in claim 12 in which a circumferential row of inserts of hard wear resistant material is mounted in said portion of maximum diameter and propect therefrom, each insert having its longitudinal axis extending at an oblique angle to said drill body portion, all of said inserts having their axes extending at approximately the same angle to the axis of said drill body portion.

15. The rotary drill claimed in claim 12 in which said reaming portion has a plurality of axially spaced grooves therein and a circumferential row of said inserts is in each of said grooves.

References Cited
UNITED STATES PATENTS

| | | | |
|---|---|---|---|
| 2,203,846 | 6/1940 | Stancliff | 175—378 |
| 2,774,571 | 12/1956 | Morlan | 175—374 X |
| 2,939,684 | 6/1960 | Payne | 175—378 X |
| 3,137,355 | 6/1964 | Schumacher | 175—341 X |
| 3,186,500 | 6/1965 | Boice | 175—374 |

NILE C. BYERS, JR., *Primary Examiner*.